Figure 1:
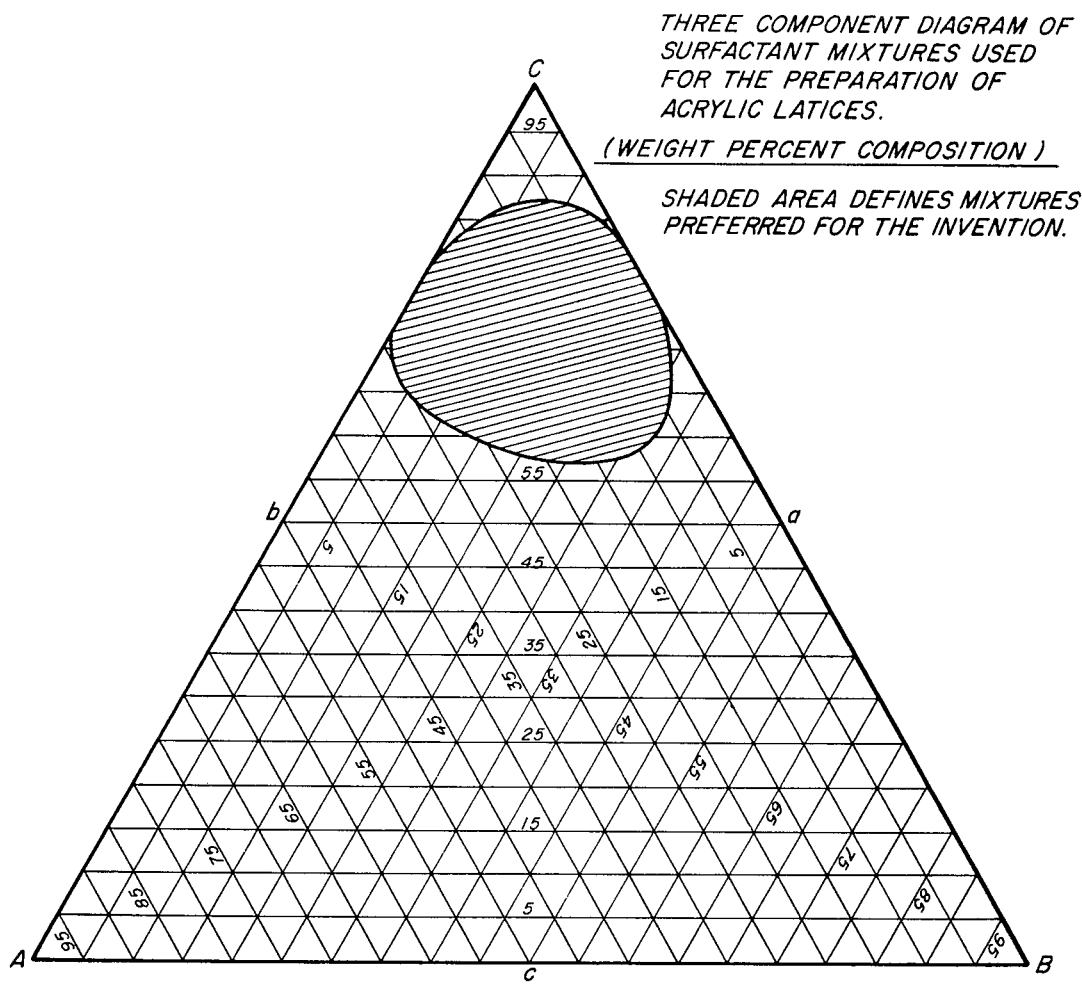

United States Patent [19]

Burkhard et al.

[11] 4,029,624

[45] * June 14, 1977

[54] EMULSION POLYMERIZATION OF ACRYLATE OR OTHER VINYL MONOMERS USING SELECTED MIXTURES OF SOLUBLE SALTS OF CERTAIN SULFOSUCCINIC ACID HALF ESTERS

[75] Inventors: Herbert Burkhard, Eastchester, N.Y.; Nelson Nae-Ching Hsu, Stamford, Conn.; Edward Joseph Fetter, East Brunswick, N.J.

[73] Assignee: American Cyanamid Company, Stamford, Conn.

[ * ] Notice: The portion of the term of this patent subsequent to Mar. 30, 1993, has been disclaimed.

[22] Filed: Dec. 8, 1975

[21] Appl. No.: 638,478

Related U.S. Application Data

[63] Continuation-in-part of Ser. No. 457,287, April 2, 1974, Pat. No. 3,947,400.

[52] U.S. Cl. .................. 260/29.6 TA; 252/354; 260/29.6 T; 260/29.6 MQ
[51] Int. Cl.² ............... C08L 33/08; C08L 33/10; B01F 17/10
[58] Field of Search ...... 252/354, 29.6 TA, 29.6 T, 252/29.6 MQ

[56] References Cited

UNITED STATES PATENTS

| | | | |
|---|---|---|---|
| 3,242,121 | 3/1966 | Hill | 260/29.6 TA |
| 3,329,640 | 7/1967 | Scotti et al. | 260/29.6 MQ |
| 3,423,351 | 1/1969 | Pierce et al. | 260/29.6 MQ |
| 3,642,676 | 2/1972 | Saunders et al. | 260/29.6 MQ |
| 3,714,096 | 1/1973 | Biale | 260/29.6 T |
| 3,736,282 | 5/1973 | Fetter et al. | 260/29.6 MQ |
| 3,836,497 | 9/1974 | Turck | 260/29.6 T |

*Primary Examiner*—H.S. Cockeram
*Attorney, Agent, or Firm*—Gordon L. Hart

[57] ABSTRACT

For use as an emusifier for emulsion polymerization of acrylate monomer mixtures, there is provided a novel mixture of soluble salts of sulfosuccinate half esters of two or three alcohols, each selected from a different class defined and each respective half ester being present in a defined range of proportions in the mixture. The defined emulsifiers, even when used at concentrations less than usual for emulsion polymerization, produce acrylate latex products having a favorable combination of several advantageous properties, particularly good mechanical stability and low viscosity, even when a cross-linking monomer is included in the monomer mixture to be polymerized.

24 Claims, 3 Drawing Figures

EMULSION POLYMERIZATION OF ACRYLATE OR OTHER VINYL MONOMERS USING SELECTED MIXTURES OF SOLUBLE SALTS OF CERTAIN SULFOSUCCINIC ACID HALF ESTERS

This is a continuation-in-part of copending Aplication Ser. No. 457,287, filed Apr. 2, 1974 now U.S. Pat. No. 3,947,400, patented Mar. 30, 1976.

The invention relates to improvements in process for emulsion polymerization of certain vinyl monomers to make polymer latices and to emulsion polymer latex that has improved properties and to novel surfactant mixtures useful in such improved processes and in such improved latex.

It is known a variety of polyvinyl latices can be prepared by emulsion polymerization of any of several vinyl monomers or mixtures thereof dispersed in aqueous medium. Several surfactant compositions have been proposed in prior art for incorporation in small proportions in the pre-polymer mix as emulsifying agent for improvement of the emulsion polymerization and the latex product. Such improvements obtained by use of the selected surfactant may result from modifying effects during the emulsion polymerization or the surfactant may modify the latex properties or in some instances the presence of a particular surfactant in the latex product will effect an improved result during the ultimate use of the product. Usually a selected surfactant will be found to have several different effects in the process of emulsion polymerization, in the ultimate latex product and during the end use of the latex. While some of these effects may be advantageous, it is very often the case that some other effects of the selected surfactant are unwanted. The selection of a most suitable surfactant as the emulsifier for use in any emulsion polymerization latex will depend upon the favorable modifications that are wanted and which the surfactant can give and, equally important, upon the absence of any intolerable side effects from use of the same surfactant in the latex.

Some specific improvements that have been obtained by the use of incorporated surfactants in the emulsion polymerization of vinyl monomers in several instances have included improvement of the mechanical stability of the emulsion or improved rate of polymerization or improved higher molecular weight of the polymer or improved higher limit of solids content in the emulsion or improved control of the heat of polymerization, etc. and combinations of several of such effects. Concomitant undesired effects that are sometimes found when some surfactants are used have included, in several instances, increase of polymer loss due to coagulum or increase of the emulsion viscosity or unwanted pH sensitivity or inhibition of the activity of the polymerization initiator, etc. and combinations of several of such effects.

An object of the invention is to provide novel surfactant mixtures that are designed particularly for use as emulsifiers for the making of acrylic latex by emulsion polymerization and particularly for making latices which have incorporated cross-linking monomer units in the polymer chain. These emulsifiers have the particular advantage that a self-cross-linking monomer can be incorporated in the prepolymer mix, and hence in the polymer latex, at higher than usual concentrations while maintaining a latex with high solids content and relatively low emulsion viscosity and relatively high degree of mechanical stability. The emulsifiers of the invention have the further advantage that the desired emulsifying effects can be obtained with relatively lower than usual concentration of total surfactants in the latex, and this advantage provides improved water resistance in the polymer product for which the latex is ultimately to be used. The emulsifiers of the invention are especially preferred for use in making acrylic polymer latices by emulsion polymerization of acrylic monomers or mixtures of acrylic monomers having modifying amounts of other vinyl comonomers. Such polymer latex emulsions are used in a variety of applications, typically for use in paper coating, or in paint making, or as binders for non-woven fabrics, or for leather finishing or textile finishing, etc. The particular emulsifiers of this invention will be found to provide improvements when used as emulsifiers for other vinyl monomer emulsions to be polymerized, and particularly so for making polymer latices that are intended for an end use in which improved water resistance is sought.

The surfactants that are used as emulsifiers for emulsion polymerization of vinyl monomers in accordance with the invention are certain mixtures of soluble salts of the sulfosuccinate half esters of two or three different alcohols, preferably of three different alcohols, each of such half esters in the mixture being selected from a different one of the following groups, and each present in the mixture, in a proportion within the described range sufficient to make up the entire mixture of the described half ester components to 100 percent:

From 0 to about 30 percent by wt. of a soluble salt of the sulfosuccinate half ester of an alkyl polyoxyethylene alcohol having the formula
$R(OCH_2CH_2)_nOH$ wherein
R is alkyl having 6 to 20 carbon atoms;
n is value in the range from 2 to 50; and From 0 to about 33 percent by wt. of a soluble salt of the sulfosuccinate half ester of polyethoxyalkylphenol having the formula

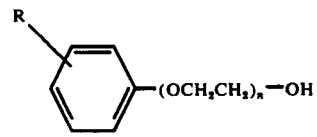

R is alkyl having 6 to 12 carbon atoms, and
n is value in the range from 2 to 50; and From about 57 to about 87 percent by weight of a soluble salt of the sulfosuccinate half ester of a branched-chain alkanol having 8 - 12 carbon atoms, such as isodecanol, isooctanol, 2-ethyl hexanol, isononanol, 2,6-dimethyl-4-heptanol, 2,6,8-trimethyl-4-nonanol, and the like. The preferred soluble salts of the sulfosuccinate half esters are usually the disodium salts but other soluble salts may have other solubilizing cations such as potassium, ammonium or the like.

A most preferred selection of half-ester components from each of the groups defined above, and the proportion by weight of each in the most preferred mixture consists of the disodium sulfosuccinates of:

Component A) $C_{10-12} H_{21-25}(OCH_2\text{-}CH_2)_5OH$ — about 15% (as available under tradename Alfonic 1012-60)
Component B)

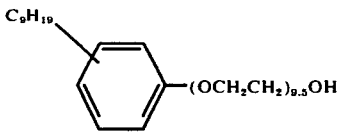

about 10% (as available under tradename surfonic N-95)

Component C) isodecanol — about 75%

A mixture of the several half ester components for use as the emulsifier can be prepared either by mixing the several components directly or by using a mixture of the several alcohols (each in the relative proportion equivalent to the ultimate proportion of its corresponding disodium sulfosuccinate half ester in the desired surfactant mixture) for the partial esterification of maleic acid anyhdride, and then sulfonating the mixture of half-acid esters to obtain the sulfosuccinate half ester. The same series of reactions for preparing the separate disodium sulfosuccinate half esters is well known, having been described in several patents, for example, in U.S. Pat. Nos. 3,329,640 and 3,736,282. The chemical composition of the mixtures will be the same whether prepared by direct mixing of the respective half ester sulfosuccinates prepared separately or by the coesterification of maleic anhydride using the mixed alcohols followed by sulfonation as described.

A mixed sulfosuccinate half-ester surfactant is prepared by the process described for preparation of Emulsifiers A, B anc C in the U.S. Pat. No. 3,329,640, with the exception that the following parts of material by weight are used. The final product is an aqueous 50% solution.

| Materials | Parts % by wt. |
| --- | --- |
| Alfonic 1012-60 | 4.70 |
| Surfonic N-95 | 3.65 |
| Isodecanol | 15.21 |
| Maleic Anhydride | 11.50 |
| Sodium Sulfite (Anhydrous) | 14.95 |
| Water | 50.00 |

The weight percent (wt. %) proportions of the respective disodium sulfosuccinate half esters in the surfactant produce mixture is as follows:

| Component A | — | 15 wt. % |
| --- | --- | --- |
| Component B | — | 10 wt. % |
| Component C | — | 75 wt. % |

The surfactant mixtures of the invention are useful as emulsifiers for the prepolymerization mixture of monomers in the making of acrylate polymer by emulsion polymerization and copolymer latices and particularly those in which the acrylate copolymer contains major proportions of one or more acrylate monomers copolymerized with a minor proportion of a vinyl monomer which can function as a cross-linking agent. In the following examples a standardized polymer recipe is used throughout for purposes of comparison, but the surfactant mixtures of the invention will be also an emulsifier of choice for emulsion polymerization of other acrylate and meth-acrylate monomer recipes that contain major proportions of acrylate monomers such as ethyl acrylate, methyl methacrylate, butylacrylate etc. Such recipes may also contain minor proportions of other vinyl comonomers for modification of the properties of the acrylate copolymers, such as N-methylolacrylamide, hydroxyethyl methacrylate or N-(iso-butoxymethyl)acrylamide added as cross-linking agents; acrylonitrile added for solvent resistance; itaconic acid, acrylic acid or methacrylic acid added for acid functionality, mechanical stability, or the like. Styrene or vinyl acetate is sometimes substituted for methyl methacrylate as a major constituent in a latex of the kind contemplated.

For comparative tests a copolymer latex containing 50% solids, in which the copolymer contained 66 wt. % ethyl acrylate units, 31 wt. % methyl methylacrylate units and 3 wt. % N-methylolacrylamide (as cross-linking agent), was prepared by the following procedure using in each instance a selected surfactant for determination of the suitability of the selected surfactant as emulsifier for making the polymer latex.

PROCEDURE

Into 92 parts (by wt.) of deionized water previously boiled, cooled and purged with nitrogen, are added 3.0 parts of the surfactant selected for use as emulsifier (50% solids in water) and 10 parts methanol. A solution of 2 parts ammonium persulfate in 18 parts water is added and the entire mixture is purged with nitrogen for 15 minutes and then transferred to a polymerization vessel where it is heated to 60° C. with continuous stirring and with the nitrogen purge continued during heating. In a separate addition vessel equipped for agitation there is added 60 parts water, 3.0 parts of the selected surfactant mixture, 10 parts methanol and 0.4 parts sodium metabisulfite, followed by addition of 132 parts ethyl acrylate and 62 parts methyl methacrylate. This preemulsified monomer mixture is purged with nitrogen for 15 minutes and kept in the addition vessel with constant agitation. When the contents of the polymerization vessel reach 60° C., the purge is reduced to minimum and addition of the monomer mixture into the polymerization vessel is begun. The rate of addition is adjusted to about 5 parts per minute, and addition is continued at that rate until about 15% of the mixture has been added. The addition is then stopped until initiation of the polymerization is observed. The reaction temperature is maintained at 60° C. Before resuming the addition, a pre-mixed solution of 10 parts of 60% N-methylolacrylamide aqueous solution and 10 parts water is added and mixed into the contents of the addition vessel. Addition of the monomer mixture to the polymerization vessel is resumed and continued at the 5 parts per minute rate until completed. Total addition time is 2 to 3 hours. The latex is held in the polymerization vessel at 60° C. for one hour after the addition is completed then the latex is cooled to room temperature.

TESTING

The vessel is opened and the latex is removed and filtered to determine the wt. percent of filterable coagulum based on the total weight of latex produced. The vessel is rinsed with water and then inspected for wall coagulum. When wall coagulum is present, the amount is determined by air-drying the vessel, then cleaning the vessel with about 225 mls. of chloroform which dissolves the wall coagulum. The solvent is agitated in the vessel at about 57° C. for 1-½ hours then the solution is poured into a crystallizing dish; the solvent is evaporated and the dried product is weighed.

The filtered latex is tested for mechanical stability by agitating a 50-ml. sample of the latex in a jar, by means of a twin-blade, high speed agitator rotating at 6300 rpm. Such agitation is continued for 15 minutes or for a shorter time if the emulsion breaks. After agitation for 15 minutes the latex is filtered and the coagulum which collects on the filter is weighed. In cases involving the acrylic polymers, when the emulsion breaks before 40 minutes the time in minutes required to break the emulsion is recorded.

To determine the percent solids in the emulsion, a weighed sample of the emulsion is placed on an aluminum dish and dried on a hot plate at 150° C. for 30 minutes, then weighed again. From the measured weights of the sample before and after drying, the percent solids composition of the emulsion is calculated.

Viscosity of the emulsion in centipoise is measured by a Brookfield Viscometer using spindle No. 2 operating at 60 rpm at room temperature.

Particle size of the polymer in the latex is determined using an electron microscope by the method described in U.S. Pat. No. 3,329,640.

Heat stability is measured in accordance with ASTM D1925-63T by the process described in U.S. Pat. No. 3,329,640.

Surface tension is measured by standard procedure. Measured values of several properties of the latices made and tested by the foregoing procedure and testing, using different selected mixtures of Component A, Component B and Component C emulsifiers in the several instances, are tabulated in Table I. Several latices are prepared by the procedure described above, using in each instance an emulsifier made with a mixture of Component A, Component B and Component C in the preparations shown in Table I. The test results that are critical for selection of the preferred emulsifier are mechanical stability and viscosity and the results of those tests for each emulsion are shown in Table I. Also shown in Table I is the method used for making the emulsifier mixture used in each instance. When prepared by esterification using a mixture of alcohols, followed by sulfonation as described above, the mixture of surfactant is called a hybird. When prepared by mixing the several Components A, B and C which have been made separately, the mixture is called a blend. Other test values are not listed for each polymerization in Table I because they were generally satisfactory in most instances and were not critical to the selection. Emulsions made by the procedure described had test results in the following ranges.

| Filterable Coagulum | — below 0.2% |
| Wall Coagulum | — below 0.05% |
| Percent Solids | — 50% |
| Particle Size | — 1500–4500 Å (2500 Å average) |
| Heat Stability | — clear film, no discoloration at 150° C. for 60 min. |
| Surface Tension | — 35–40 dynes/cm. |

TABLE I

| | Emulsion Test Results | | | | Test Results | |
| | Emulsifier Components | | | | | |
| Emulsion | Component A wt. % | Component B wt. % | Component C wt. % | Mixed by | Mechanical Stability min. | Viscosity cps |
|---|---|---|---|---|---|---|
| 1 | 0 | 50 | 50 | blend | 4 | 310 |
| 2 | 25 | 50 | 25 | blend | 2 | 310 |
| 3 | 25 | 25 | 50 | blend | 7.5 | 360 |
| 4 | 8 | 7 | 85 | blend | 40 + | 130 |
| 5 | 10 | 30 | 60 | blend | 40 + | 212 |
| 6 | 12.5 | 12.5 | 75 | blend | 40 + | 50 |
| 7 | 20 | 15 | 65 | blend | 40 + | 190 |
| 8 | 15 | 10 | 75 | hybrid | 40 + | 160 |
| 9 | 15 | 10 | 75 | blend | 40 + | 160 |
| 10 | 22.2 | 7.8 | 70 | hybrid | 40 + | 242 |
| 11 | 20.5 | 9.5 | 70 | hybrid | 40 + | 148 |
| 12 | 43.8 | 14.5 | 41.7 | blend | 2 | 475 |
| 13 | 24.2 | 8.0 | 67.8 | blend | 5 | 225 |
| 14 | 21.9 | 7.1 | 71.0 | blend | 16 + | 125 |
| 15 | 19.5 | 7.2 | 73.3 | blend | 30 + | 95 |
| 16 | 19.7 | 6.4 | 73.9 | blend | 15 + | 270 |
| 17 | 16.7 | 5.5 | 77.8 | blend | 16 + | 260 |
| 18 | 23.5 | 0 | 76.5 | blend | 16 + | 125 |
| 19 | 44.2 | 0 | 55.8 | blend | coagulates | |
| 20 | 0 | 0 | 100.0 | blend | coagulates | |
| 21 | 0 | 23.1 | 76.9 | blend | 15 + | 250 |
| 22 | 72.9 | 27.1 | 0 | blend | 1 | 860 |
| 23 | 100 | 0 | 0 | blend | 0.25 | 725 |
| 24 | 0 | 100 | 0 | blend | 0.5 | 1065 |
| 25 | 22.7 | 3.1 | 74.2 | blend | 20 + | 185 |
| 26 | 25 | 16.7 | 58.3 | blend | 7.5 | 210 |
| 27 | 15 | 10 | 75 | hybrid | 40 + | 148 |

The test results tabulated in Table I are illustrated in the drawings, wherein:

FIG. 1 is a 3-component diagram on which is plotted a shaded area representing the range of compositions of the mixtures that were found suitable for use according to the invention as emulsifiers for emulsion polymerization of acrylate monomers. In each of FIGS. 1, 2 and 3, the respective components designated A, B and C on the diagram are the same half ester components which are designated above as the preferred Component A, Component B and Component C, respectively.

Figure 2:
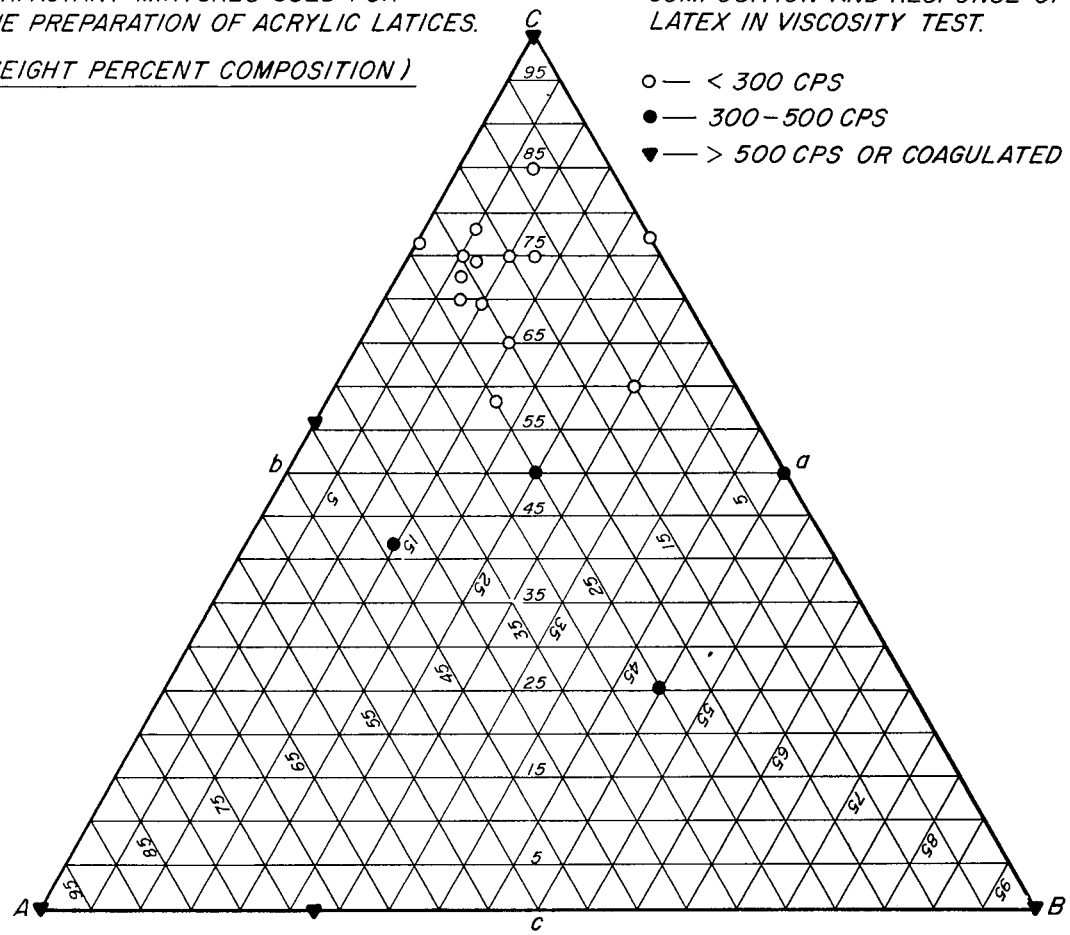

FIG. 2 is a 3-component diagram on which are plotted the date tabulated in Table I in the column headed Viscosity. Each point location on the diagram identifies the composition by wt. % of each of the three components of a surfactant that was used for making a specific latex tested. Each point indicator identifies a range of values in which the measured viscosity of that latex was classified.

Figure 3:
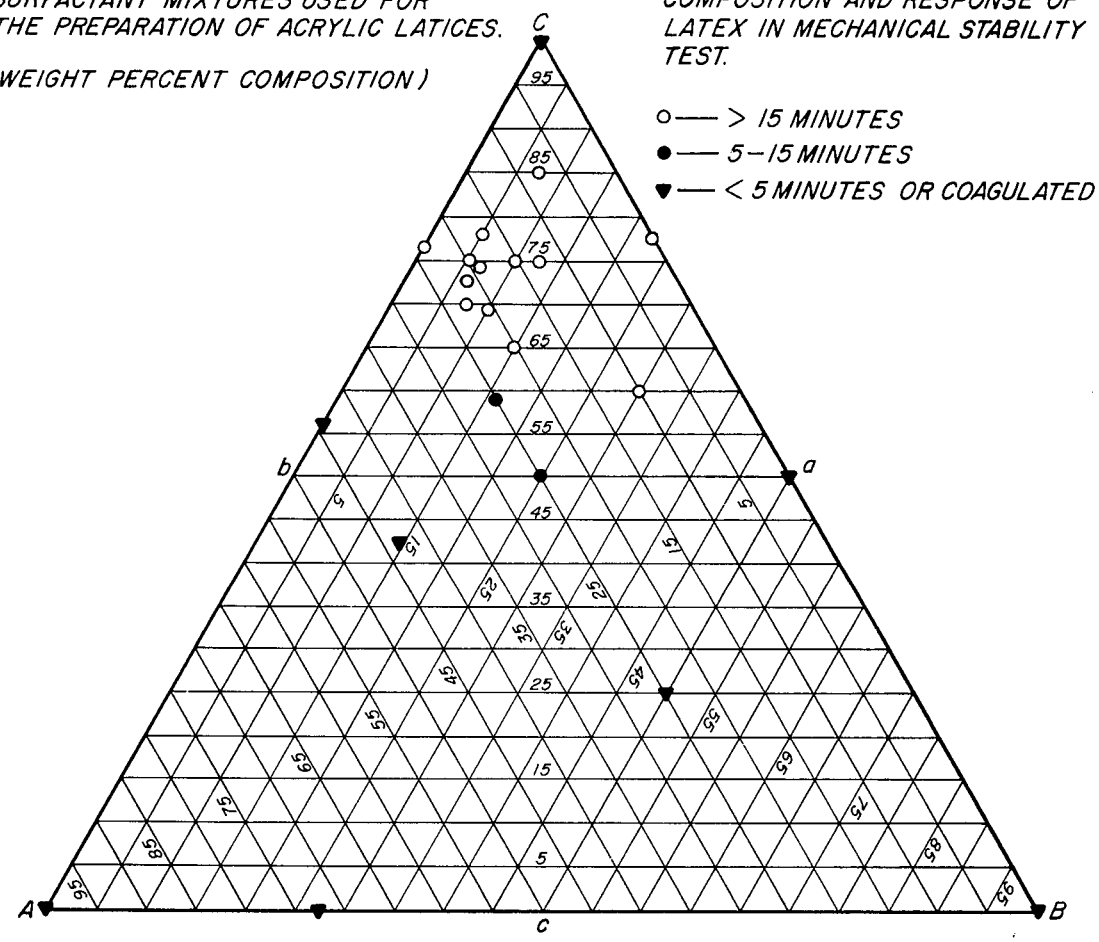

FIG. 3 is a 3-component diagram on which are plotted the data tubulated in Table I in the column headed Mechanical Stability. Each point location on the diagram identifies the composition of a surfactant that was used for making a specific latex tested, and each point indicator identifies a range in which the mechanical stability value found in the test of that latex was classified.

Referring now to Table I and FIGS. 2 and 3, it is seen that all of the latices tested that had both viscosity and mechanical stability values in the suitable ranges, i.e., stability more than 15 minutes, viscosity less than 300 cps, fell within a rather well defined area on the diagrams. This area represents a range of compositions that would be expected to give suitable results, similar to the results found using specific compositions identified by the location of specific points in the area. On the other hand, other surfactants tested that had compositions falling outside this preferred range of compositions were found to produce results that were less than suitable in terms of either the viscosity or the mechanical stability of the polymer latex, or both. Accordingly, the preferred range of surfactant compositions falls within the shaded area outlined in FIG. 1, as derived from the data plotted on FIGS. 2 and 3. This is the range of compositions, in terms of wt. percent of each of the Components A, B and C, that are found useful as emulsifiers for emulsion polymerization of acrylate comonomers in accordance with the invention.

A great many other surfactant compositions of various kings were tested for suitability as emulsifiers for acrylate monomers in emulsion polymerization to make acrylate copolymers. The procedure and testing described above was used for the screening except concentrations up to about 3% emulsifier were used. Many were eliminated because of failure in one or more of the tests described. Many caused complete coagulation, other excessive filterable or wall coagulum; many produced emulsions with low mechanical stability or emulsions with excessively high viscosity. Some specific examples of surfactants tested (identified by the tradename under which they were obtained) and the critical test result were as follows: Triton X-405, high filterable coagulum and poor mechanical stability; Tergitol Anionic 7, coagulated; Gafac PE-510, coagulated; Aerosol OT, coagulated; Triton X-200, high coagulum. Many other were tried and eliminated for similar reasons.

In the foregoing examples and tests the concentration of emulsifier in the emulsion was about 1.5 percent, wt/wt/surfactant polymer. Emulsions prepared using the best choice of other selected surfactants as emulsifier required about twice the concentration of surfactant to obtain a 50 percent solids emulsion with the monomer recipe used. The emulsifiers of the invention are generally functional as emulsifiers when used at less than usual concentrations to obtain suitable properties in acrylate polymer latices. The invention contemplates use of the novel emulsifiers at any suitable concentration for making acrylic polymer latices; usually the optimum concentration of the surfactant for use as emulsifier inemulsion polymerization of a selected acrylate monomer recipe will be in the range from about 1 to about 4 percent by wt. based on the weight of polymer. In some instances up to 10 wt. percent of surfactant may be used.

In the foregoing examples and tests the selected vinyl monomer that was used in minor proportion in the recipe for the function of cross-linking agent was N-methylolacrylamide. It is unusual to obtain a stable, 50% solids acrylate latex when using a recipe with as much as 3% of N-methylolacrylamide in the monomer mixture with so low a surfactant level. Using the surfactant mixture of the invention at 1.5% concentration, the stability of the emulsions was quite acceptable with this high proportion of cross-linking agent.

The acrylate monomers used in the foregoing examples were about two parts ethyl acrylate to one part methyl methacrylate. This is a widely used commercial recipe but the invention contemplates the use of the novel emulsifiers with any acrylate polymer latex in which any of the several acrylate monomers are present as predominant or substantial components of the resin.

The optimum mixture of Components A, B and C is the 15/10/75 mixture described above. This was selected as emulsifier for making a variety of acrylate latices by emulsion polymerization of several different monomor mixtures described in Table II. Test results shown in the Table demonstrate the general suitability of the emulsifier for making a variety of acrylate latex products as well as an acrylic-modified vinyl-acetate polymer latex.

TABLE II

| Monomers | Composition | Latices Produced Using Components A, B, C: 15/10/75 Mixture | | |
| --- | --- | --- | --- | --- |
| | | Mech. Stab., Min. | Viscosity,cps | Coagulum,% |
| 1. EA/MMA/NMA/AN | 70/25/2/3 | 20 | 46 | .30 |
| 2. EA/NMA/AN | 87/3/10 | 40 + | 52 | .29 |
| 3. EA/NMA/IA | 95/3/2 | 40 + | 100 | .05 |
| 4. EA/MMA/NMA | 79/18/3 | 40 + | 82 | .21 |
| 5. EA/MMA/NMA/IA | 58/37/3/2 | 25 | 108 | .07 |
| 6. EA/VAc/NMA/IA | 32/63/3/2 | 17 | 350 | .08 |
| 7. EA/MMA/MAA | 48/50/2 | 40 + | 76 | .27 |
| 8. EA/MMA/NMA | 66/31/3 | 40 + | 148 | .21 |
| 9. EA/NMA | 95/5 | 40+ | 180 | .30 |
| 10. EA/MMA/IBMA/AA | 58/29/12/1 | 15 | 110 | .12 |

EA = Ethyl Acrylate
MMA = Methyl Methacrylate
NMA = N-Methylolacrylamide
AN = Acrylonitrile
IA = Itaconic Acid
MAA = Methacrylic Acid
VAc = Vinyl Acetate
IBMA = N-(isobutoxymethyl)acrylamide Additional emulsions were made and tested, the same as described above but instead of using isodecanol for making the Component C of the emulsifier mixture, several other $C_8$ to $C_{12}$ branched-chain alkanols were used. In several of such examples the emulsion and the emulsifier had the same compositions described above for Emulsions 8 and 27 in Table I, and were made and tested the same, with the single exception as already noted that another alkanol of the class described was used instead of isodecanol in each example. In Table III the test results are tabulated, showing the particular $C_8 - C_{10}$ branched-chain alkanol that was selected for making the Component C of the emulsifier used in each emulsion and showing the test results as found in testing each emulsion. These emulsifiers were all hybrid mixtures of the disodium sulfosuccinate half esters of Alfonic 1012-60 (15%), Surfonic N-95 (10%), and the selected $C_8$ to $C_{10}$ branched-chain alkanol (75%), respectively.

TABLE III

| Emulsion | Component C Alcohol Used for Making the Emulsifier | LATEX TEST RESULTS | | | | |
|---|---|---|---|---|---|---|
| | | Mech. Stab. Min. | Viscosity, cps | Total Coagulum % | Particle Size, Å | Surface Tension dynes/cm |
| 1 | 2-Ethyl Hexanol | 27 + | 130 | .20 | — | — |
| 2 | 2-Ethyl Hexanol | 16 + | 122 | .05 | 2500–4350 | 36 |
| 3 | Isooctanol | 40 + | 118 | .02 | — | — |
| 4 | Isooctanol | 18 + | 104 | .60 | 2200–4500 | 43 |
| 5 | Isononanol | 40 + | 86 | .06 | 2500–5750 | — |
| 6 | Isononanol | 15 + | 270 | .09 | — | 42 |
| 7 | 2,6-Dimethyl-4-Heptanol | 17 + | 69 | .13 | — | — |
| 8 | 2,6,8-Trimethyl-4-Nonanol | 18 + | 330 | .27 | — | — |
| 9 | 2,6,8-Trimethyl-4-Nonanol | 15 + | 64 | .02 | — | — |

Still further testing of emulsions using other disodium salts of $C_8$ to $C_{12}$ alkanol half ester sulfosuccinates as the Component C in emulsifier mixtures of the kind described indicates that those made with the straight-chain alkanols will not produce acrylate emulsions which have the advantages of the invention while the emulsions that are made with these branched-chain alkanols do have such advantage. Emulsions made with the straight-chain mixtures did not have the combination of good mechanical stability (15+) and low viscosity (< 300) which characterize the emulsions made with the mixtures of the invention. The experimental results reported in Table III include the isolated instances of anomalous results as they were measured. These anomalies, namely the unusually high viscosity in Example 8 and the unusually high coagulum in Emulsion 4 of Table III are insignificant variations. While the emulsifiers that have the isodecanol half-ester salt as Component C are the most preferred, still those made using the other $C_8 - C_{12}$ branched-chain alkanols instead of isodecanol have been shown to produce acrylate emulsions having properties that approach those obtained with isodecanol and that are definitely superior to the results that are obtaind when using other closely related alcohols such as tridecanol or a straight chain $C_{10} - C_{12}$ alkanol.

Emulsions made with emulsifiers of the invention using the diammonium salts instead of the disodium salts are found to have all of the advantages of the disodium salts and are found further to be somewhat superior in one respect. When the latex emulsion is cast as a film, dried and cured, an important property of the curved film is its resistance to the development of a haze in the film when the film is wetted with water. While the acrylate emulsions made with the disodium salt emulsifiers of the invention make cured films having good water resistance properties, those made with the diammonium salts instead of the disodium salts are found to be significantly better in this regard.

It is found that films made with emulsions containing the diammonium salt emulsifiers, when cured by heating the films, will develop a degree of water resistance in less curing time than the time required under identical curing conditions to develop the same degree of water resistance in films which are identical except containing the disodium salt emulsifiers. A latex emulsion prepared the same as emulsions 8 and 27 in Table I except using diammonium salts instead of disodium salts of the same sulfosuccinate half-esters in the emulsifier, was found on testing to have viscosity, stability, coagulum and particle size properties that did not differ significantly from the same properties of the emulsion made with the disodium salts. In testing the water resistance of cured films that were cast from each of the emulsions, the emulsion made with the diammonium salt developed water resistance faster on curing. Also, the ultimate water resistance that could be developed in the film with complete curing was significantly better with the diammonium salt emulsions than with the disodium salt emulsions. The diammonium salts of the sulfosuccinate half esters are prepared the same as the disodium salts except using ammonium sulfite monohydrate instead of sodium sulfite for the sulfonation step when converting maleic acid half-esters to the sulfosuccinic acid half-esters salts by the conventional method.

We claim:
1. A surfactant mixture of 100 parts by weight consisting of:
   from 57 to 87 parts by wt. of a soluble salt of the sulfosuccinate half ester of an alcohol selected from branched-chain alkanols having 8 to 12 carbon atoms,
   from 0 to 30 parts by wt. of a soluble salt of the sulfosuccinate half ester of an alkyl-polyoxyethylene alcohol having the formula,
   $R(OCH_2CH_2)_nOH$ wherein
   R is alkyl having 6 to 20 carbon atoms and
   n is a value in the range from 2 to 50; and
   from 0 to 33 parts by weight of a soluble salt of the sulfosuccinate half ester of a polyethoxyalkylphenol having the formula,

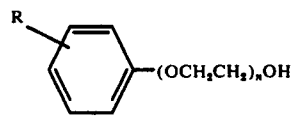

R is alkyl having 6 to 12 carbon atoms and $n$ is a value in the range from 2 to 50.

2. A surfactant mixture defined by claim 1, of 100 parts by wt. consisting of:
57 to 87 parts by wt. of diammonium isodecyl sulfosuccinate,
0 to 30 parts by wt. of diammonium sulfosuccinate of $C_{10\text{-}12}\ H_{21\text{-}25}(OCH_2\!-\!CH_2)_5OH$
0 to 33 parts by wt. of diammonium sulfosuccinate of

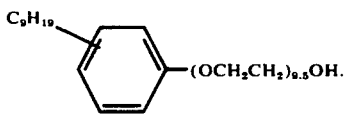

3. A surfactant mixture defined by claim 1 of 100 parts by wt. consisting of:
about 75 parts by wt. diammonium isodecyl sulfosuccinate;
about 15 parts by wt. diammonium sulfosuccinate of $C_{10\text{-}12}\ H_{21\text{-}25}(OCH_2CH_2)_5OH$, and
about 10 parts by wt. diammonium sulfosuccinate of

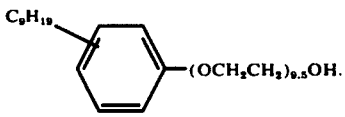

4. An aqueous latex of acrylate copolymer in which acrylate monomer units predominate, said latex containing about 1 to about 4 percent by wt. based on the polymer weight of a surfactant mixture defined by claim 1 as the emulsifier for said latex.

5. An aqueous latex of acrylate copolymer in which acrylate monomer units predominate and having a minor proportion in said polymer of cross-linking units, said latex containing about 1 to 4 percent by wt. based on the polymer weight of a surfactant mixture defined by claim 1 as the emulsifier for said latex.

6. An aqueous latex of acrylate copolymer in which acrylate monomer units selected from ethyl acrylate and methyl methacrylate predominate and having a minor proportion in said polymer of N-methylolacrylamide cross-linking units, said latex containing about 1 to 4 percent by wt. based on the polymer weight of a surfactant mixture defined by claim 1 as the emulsifier for said latex.

7. An aqueous latex of acrylate copolymer in which acrylate monomer units predominate, said latex containing about 1 to about 4 parts by wt. based on the polymer weight of a surfactant mixture defined by claim 2 as the emulsifier for said latex.

8. An aqueous latex of acrylate copolymer in which acrylate monomer units predominate and having a minor proportion in said polymer of cross-linking units, said latex containing about 1 to 4 parts by wt. based on the polymer weight of a surfactant mixture defined by claim 2 as the emulsifier for said latex.

9. An aqueous latex of acrylate copolymer in which acrylate monomer units selected from ethyl acrylate and methyl methacrylate predominate and having a minor proportion in said polymer of N-methylolacrylamide cross-linking units, said latex containing about 1 to 4 parts by wt. based on the polymer weight of a surfactant mixture defined by claim 2 as the emulsifier for said latex.

10. An aqueous latex of acrylate copolymer in which acrylate monomer units predominate, said latex containing about 1 to about 4 parts by wt. based on the polymer weight of a surfactant mixture defined by claim 3 as the emulsifier for said latex.

11. An aqueous latex of acrylate copolymer in which acrylate monomer units predominate and having a minor proportion in said polymer of cross-linking units, said latex containing about 1 to 4 parts by wt. based on the polymer weight of a surfactant mixture defined by claim 3 as the emulsifier for said latex.

12. An aqueous latex of acrylate copolymer in which acrylate monomer units selected from ethyl acrylate and methyl methacrylate predominate and having a minor proportion in said polymer of N-methylolacrylamide cross-linking units, said latex containing about 1 to 4 parts by wt. based on the polymer weight of a surfactant mixture defined by claim 3 as the emulsifier for said latex.

13. A process for polymerizing a mixture of vinyl monomers in which acrylate monomers predominate in aqueous emulsion containing 1 to 4 parts by wt. based on wt. of the monomer of an emulsifier consisting essentially of the surfactant composition defined by claim 1.

14. A process defined by claim 13 wherein the mixture of vinyl monomers comprises 1 to 10 parts by wt. of a cross-linking monomer.

15. A process defined by claim 14 wherein the mixture of vinyl monomers consists essentially of acrylate monomers and the cross-linking monomer is N-methylolacrylamide.

16. A process defined by claim 15 wherein the acrylate monomers are a mixture of ethyl acrylate and methyl methacrylate.

17. A process of polymerizing a mixture of vinyl monomers in which acrylate monomers predominate in aqueous emulsion containing 1 to 4 parts by wt. based on wt. of the monomers of an emulsifier consisting essentially of the surfactant composition defined by claim 2.

18. A process defined by claim 17 wherein the mixture of vinyl monomers comprises 1 to 10 parts by wt. of a cross-linking monomer.

19. A process defined by claim 18 wherein the mixture of vinyl monomers consists essentially of acrylate monomers and the cross-linking monomer is N-methylolacrylamide.

20. A process defined by claim 19 wherein the acrylate monomers are a mixture of ethyl acrylate and methyl methacrylate.

21. A process of polymerizing a mixture of vinyl monomers in which acrylate monomers predominate in aqueous emulsion containing 1 to 4 parts by wt. based on wt. of the monomers of an emulsifier consisting essentially of the surfactant composition of claim 3.

22. A process defined by claim 21 wherein the mixture of vinyl monomers comprises 1 to 10 parts by wt. of a cross-linking monomer.

23. A process defined by claim 22 wherein the mixture of vinyl monomers consists essentially of acrylate monomers and the cross-linking monomer is N-methylolacrylamide.

24. A process defined by claim 23 wherein the acrylate monomers are a mixture of ethyl acrylate and methyl methacrylate.

* * * * *